Jan. 13, 1959  R. P. POWERS  2,868,259
RIM

Filed Sept. 28, 1955  2 Sheets-Sheet 1

INVENTOR.
ROBERT P. POWERS
BY
W. A. Fraser
ATTY-

Jan. 13, 1959 R. P. POWERS 2,868,259
RIM

Filed Sept. 28, 1955 2 Sheets-Sheet 2

INVENTOR.
ROBERT P. POWERS
BY
W. A. Fraser
ATTY.

United States Patent Office 2,868,259
Patented Jan. 13, 1959

2,868,259

RIM

Robert P. Powers, Akron, Ohio, assignor to The Firestone Tire & Rubber Company, Akron, Ohio, a corporation of Ohio Application September 28, 1955, Serial No. 537,169

2 Claims. (Cl. 152—381)

This invention relates to automotive rims and more particularly to a drop center rim especially adapted to provide added safety for tubeless tire operation.

This application is a continuation in part of my copending application Serial No. 337,158, filed February 16, 1953, now Patent No. 2,817,381, which discloses a rim having radically tapered bead seats extending at an angle of about 15° to the axis of the rim and terminating in outwardly curved side flanges. That application also discloses an additional feature, intended to provide added safety when the rim is used for tubeless tires, which feature is embodied in a substantially cylindrical portion located immediately adjacent one of the bead seats and having a diameter which gives a compression fit with the toe portions of the tire beads. Such a cylindrical "ledge" portion enables a tire bead to maintain sealing contact with the ledge and retain air within the tire when the tire bead is bodily displaced onto the ledge from its bead seat by abnormally large forces such as those imposed on the tire in severe skids. The ledge portion is particularly effective because it takes advantage of the tendency of the tire bead to rotate upon its toe when it is subjected to axial displacement and as a result of this turning movement the tire bead becomes securely wedged upon the rim.

It is, accordingly, a general object of the invention to provide a drop center rim having maximum safety for use with tubeless tires. A more specific object is to provide a drop center rim construction for tubeless tires in which cylindrical portions are located adjacent the bead seats to act as supports for the tire beads in the event the beads are forced inwardly off their bead seats. Other objects are to provide a drop center rim for a tubeless tire which is simple in design, economical to manufacture and which enables quick and easy inflation of the tire.

Figure 1:
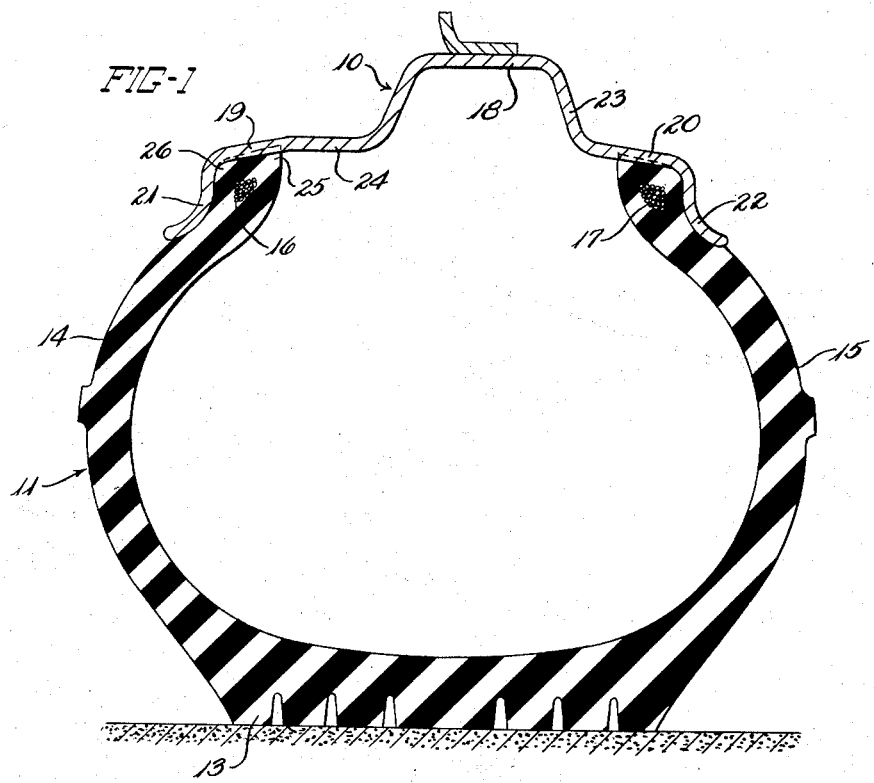
Figure 2:
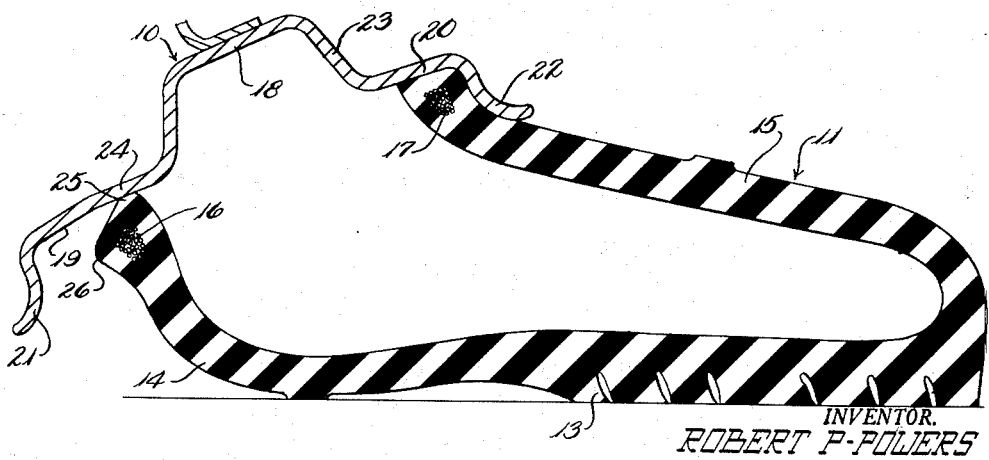
Figure 3:
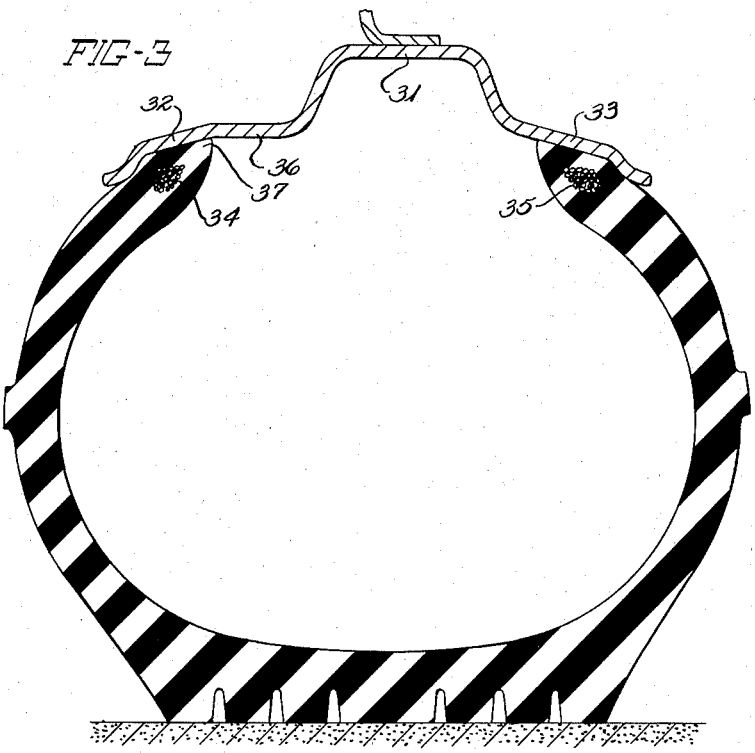

The above and further objects and advantages will be more fully apparent from the following description of the preferred form of the invention, reference being had to the accompanying drawings in which:

Figure 1 is a radial section showing a tubeless passenger tire mounted on a drop center rim embodying the invention with the tire being subjected to normal service conditions;

Figure 2 is a view similar to Figure 1 showing the distortion of the tire and the movement of the outer tire bead under a severe skid, the tire bead being displaced from its bead seat but retaining sealing engagement with the safety ledge adjacent the bead seat; and Figure 3 is a radial section corresponding to Figure 1 showing a tubeless truck tire mounted on a drop center rim of the present invention with the tire being subjected to normal service conditions.

In the drawings, a rim 10 embodying the invention is shown supporting a more-or-less conventional tubeless tire 11 which comprises a tread portion 13, sidewalls 14 and 15 and beads 16 and 17 respectively. In the following description the tire will be regarded as being mounted on the right front wheel of an automobile with the sidewall 14 being at the outside of the automobile, at the left of Figures 1 and 2.

The rim 10 is of drop center construction having a central well portion 18 and bead seats 19 and 20 extending at an angle of about 5° to the axis of the tire and terminating in side flanges 21 and 22. The tire beads are molded at an angle of about 8° to have a tight compression fit with their bead seats, this fit being indicated by the dotted lines of Figure 1 which show the molded dimensions of the beads. In practice, a compression fit with the bead seats averaging 0.125 inch on the diameter has been satisfactory, with the compression greatest at the toe and being about 0.189 at that point.

The inside bead seat 20 extends with unchanged angle to the wall 23 of the drop-center well but the outside bead seat 19 is connected to the drop-center well by a cylindrical portion 24 of substantial axial length, this portion being referred to hereafter as the "ledge" or "safety ledge" portion of the rim. It will be noted that the toe 25 of bead 16 is positioned at the junction of seat 19 and the ledge 24 when the bead is mounted on the bead seat 19 abutting flange 21.

The safety ledge 24 has a diameter such that the toe 25 of the bead 16 of the tire will have a tight compression fit with the ledge throughout its length. In the case of a 15 inch passenger rim, the cylindrical ledge portion should have a diameter of about 14.838 inches, to provide support for a tire having a molded bead diameter at the toe of about 14.649 inches. With these relative dimensions the toe 25 will have a compression fit upon the ledge portion of 0.189 inch on the diameter and this has proved to be successful in actual tests. Greater amounts of compression are not objectionable and in severe service may be desirable.

While the safety ledge has been described as cylindrical in form, small-angled conical surfaces can be used without losing the effectiveness of the ledge. For example, a "cylindrical" ledge will necessarily have commercial tolerances in both angle and dimension, the angle varying within ±1°. Minor deviations in angle are therefore comprehended by the term cylindrical in this description and in the claims so long as the results of the invention are attained. However, when the angle of the ledge becomes too great, the loss in compression between the toe of the bead and the ledge will rapidly become dangerously low as the bead moves inward upon the ledge. For example, an extension of the 5° bead seats to the drop center well is inoperable as a safety ledge for even a slight movement of the bead away from the side flange will result in an explosive loss of air and collapse of the tire.

The axial length of the safety ledge 24 is also important. It is desirable that the safety ledge be appreciably longer than the bead which is to be supported, so that the ledge will be able to accommodate a wide range of bead displacement under all conditions. In the present example, the tire beads and their corresponding bead seats have an axial component of about 0.75 inch and the ledge 24 is 0.88 inch in length and may advantageously be even longer.

The advantages offered by the safety ledge 24 will be appreciated by considering the manner in which it supports tire bead 16 in service. For example, if an automobile is cornered to the left at a high speed, most of the weight of the automobile will be transferred to the outside wheels, and terrific axial forces will be exerted on the right front wheel of the car distorting the tire and tending to force the outer tire bead off its rim seat. If the automobile skids at this moment and if the ground is soft the forces may become so great as to pull the outer bead 16 off its seat onto the safety ledge 24, see Figure 2. The forces are transmitted to the bead 16 by the tire sidewall 14 which exerts a pull on the bead causing the heel 26 to lift from the bead seat and causing the bead to rotate upon the toe 25 as the bead moves onto the safety ledge. The rotation of the bead wedges it tightly upon the ledge providing an additional resistance to further bead movement and resulting in an even tighter sealing contact between the toe and the ledge. The safety ledge and the tire thus cooperate to provide a remarkably effective measure of safety.

The safety provided by the ledge 24 is evidenced by one test in which the front wheels of a car were cramped full to the left while the car was driven at high speed over soft ground. This maneuver caused the car to careen over onto the right wheels and caused the right front tire to plow a furrow deep into the ground. The outside bead was forced bodily off its seat onto the ledge in the manner shown in Figure 2, yet air was retained in the tire and at the conclusion of the skid the tire was able to support the car at normal driving speeds.

If, as shown in the drawings, a safety ledge is provided adjacent only one of the bead seats, care should be taken to secure the rims to the wheels so that the ledge portions 24 will be positioned toward the outside of the car. In the outside positions, the safety ledges will support the outside beads at the right side of the car when the car is skidding to the right and they will support the outside tire beads at the left side of the car when the car is skidding to the left. It has been observed that the inside tire beads need not be supported with safety ledges because when an automobile skids or corners sharply the weight of the car is transferred to the outside beads relieving the forces on the inside beads. Experience has thus shown that a rim need be provided with only one safety ledge provided care is taken to position the rims properly on the car, but it is, of course, within the scope of the present invention to provide safety ledges adjacent each rim bead seat.

Safety ledges have also proven successful for use in truck rims of drop center design. Such a rim as shown in Figure 3 has a well portion 31 and bead seats 32 and 33 extending at an angle of about 15° to the axis of the tire to support tire beads 34 and 35 which are molded to fit the bead seats with a tight compression fit. A safety ledge 36 is provided adjacent bead seat 33 to support the toe 37 of the adjacent bead 34 in the event the bead becomes displaced from its bead seat. For satisfactory results the toe of the tire bead should have a compression fit with the safety ledge of about .20 inch, as measured on the diameter.

Various modifications will no doubt occur to those skilled in the art without departing from the spirit and scope of the invention, the essential features of which are summarized in the appended claims.

I claim:

1. A drop-center rim for use in the combination of a wheel and a tubeless tire, said rim having angularly inclined inner and outer bead seats extending at an angle to the axis of the wheel and terminating in side flanges at the inner and outer sides of said wheel to provide radial and axial support, respectively, for the inner and outer beads of said tire, said rim having a substantially cylindrical ledge portion immediately adjacent and greater in axial extent than said outer bead seat, said substantially cylindrical ledge portion having a diameter providing a compression-fit with the toe of the bead of the tire mounted on said outer bead seat whereby, when severe axial forces are imposed upon said tire, in a direction to displace said outer tire bead from its bead seat, said ledge portion provides a supporting surface for and maintains sealing contact with said displaced outer tire bead.

2. The combination of a wheel and a tubeless tire, said wheel comprising a rim having angularly inclined inner and outer bead seats extending at an angle to the axis of the wheel and terminating in side flanges at the inner and outer sides of said wheel to provide radial and axial support, respectively, for the inner and outer beads of said tire, said rim having a substantially cylindrical ledge portion immediately adjacent and greater in axial extent than said outer bead seat, said substantially cylindrical ledge portion having a diameter providing a compression-fit with the toe of the bead of the tire mounted on said outer bead seat whereby, when severe axial forces are imposed upon said tire in a direction to displace said outer tire bead from its bead seat, said ledge portion provides a supporting surface for and maintains sealing contact with said displaced outer tire bead.

References Cited in the file of this patent

UNITED STATES PATENTS

| 1,640,844 | Main | Aug. 30, 1927 |
| 2,709,472 | Hofweber | May 31, 1955 |

FOREIGN PATENTS

| 634,356 | Germany | Aug. 25, 1936 |
| 69,919 | Denmark | Sept. 19, 1949 |